Patented Oct. 17, 1950

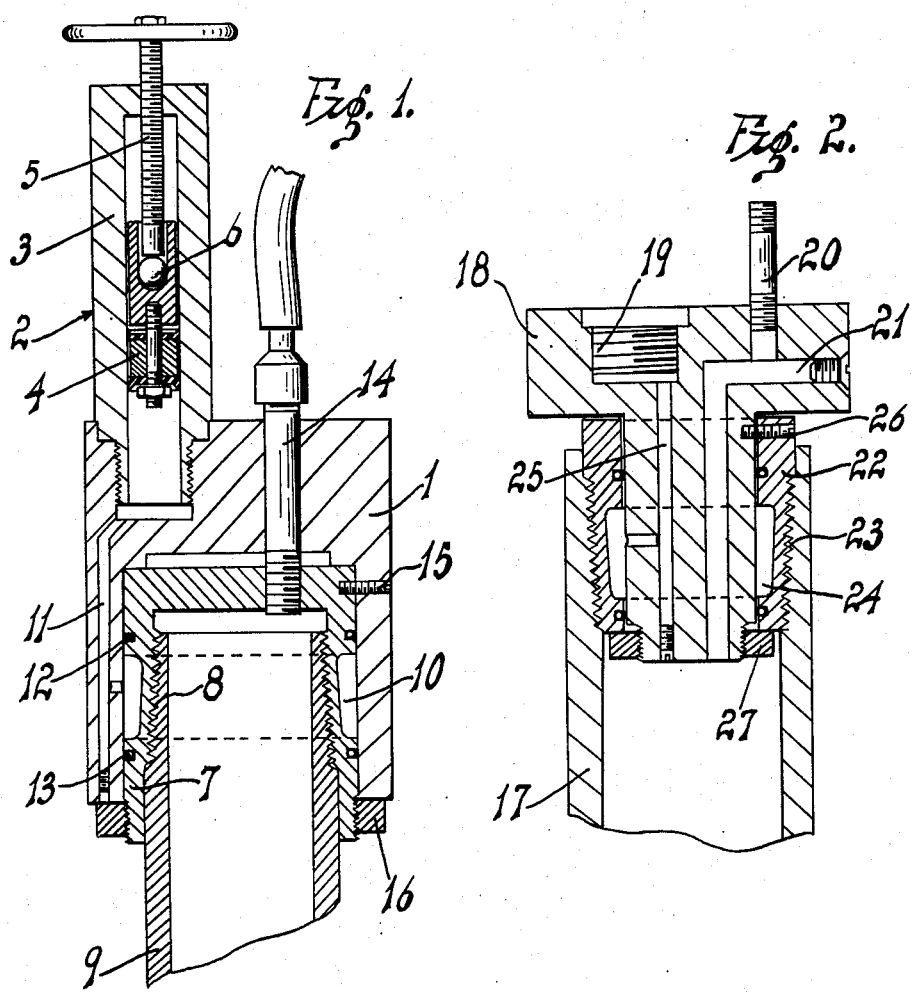

2,526,172

UNITED STATES PATENT OFFICE 2,526,172

PIPE TESTING PLUG

Benjamin W. Sunde, Long Beach, Calif., assignor to Blackwell & Sunde, Inc., Long Beach, Calif., a corporation of California Application May 19, 1947, Serial No. 748,955

10 Claims. (Cl. 138—90)

In the testing of pipe by means of fluid under pressure, it is necessary to mount a plug at both ends of the length of pipe. These plugs are threaded into one end of the pipe depending on the nature of the pipe threads, and due to the fact that these plugs are frequently removed and re-inserted, the threads thereof become worn and these worn threads will cause a leak which might be attributed to the threads of the pipe.

An object of my invention is to provide a pipe testing plug, the threads of which can be pressed tightly into position by hydraulic pressure, thus resulting a tight thread contact with the pipe threads irrespective of the condition of the threads of the plug.

Another object of my invention is to provide a novel pipe testing plug provided with a hydraulic pump which exerts pressure against the threads of the plug and pressing these threads tightly into and against the threads of the pipe or coupling.

A feature of my invention is to provide a structure of the character stated which can be adapted to either internal or external threads.

Another feature of my invention is to provide a pipe testing plug in which the threaded fitting is replaceable if it becomes worn or broken.

Other objects, advantages and features of invention may appear from the accompanying drawing, the subjoined detailed description and the appended claims.

In the drawing:

Figure 1 is a longitudinal sectional view of my pipe testing plug as applied to external threads.

Figure 2 is a longitudinal sectional view of my pipe testing plug as applied to internal threads.

Referring more particularly to the drawing, the numeral 1 indicates a plug body into which a manually operable hydraulic pump 2 is fitted. This pump consists of a cylinder 3 which screws into the body 1. A piston 4 in the cylinder is moved downwardly to exert pressure on a column of fluid by means of a threaded post 5, which screws into the cylinder 3, and is rotated by hand. The post 5 bears against a thrust bearing 6 so that piston 4 may be lowered without causing it to rotate.

A sleeve 7 is fitted in the body 1 and in this instance the sleeve is provided with internal threads 8 which fit the external threads of the pipe 9. The sleeve 7 is provided with an annular cut-out portion 10, this cut-out portion being opposite the threads 8. The purpose of this cut-out is to reduce the wall thickness back of the threads 8 so that this wall can be distorted in order to press the threads tightly into and against the pipe threads.

A duct 11 extends from the hydraulic pump 2 and thence into the cut-out 10. The cut-out 10 forms an annular chamber and this annular chamber as well as the duct 11, and the pump 2 are filled with a fluid, and when pressure is exerted on this column of fluid by the cylinder 4, the threaded wall of the sleeve 7 will be pressed inwardly, thus sealing the threads and preventing leakage. Annular packings 12 and 13 are provided above and below the cut-out 10, thus sealing the annular fluid space in the sleeve 7 and preventing leakage therefrom. The usual fluid pipe 14 extends through the body 1 and through the top of the sleeve 7, thus permitting fluid under pressure to be forced into the pipe 9, for the purpose of testing the same.

A set screw 15 extends through the body 1 and into the sleeve 7 thus holding this sleeve into position. As a further locking means for the sleeve 7, and further to prevent longitudinal movement of the sleeve in the body 1, I provide a ring 16 which screws on to the bottom of the sleeve 7 and bears against the bottom of the body 1.

In Figure 2 I have shown my pipe testing plug as applied to the internal threads of a pipe 17. The body 18 is threaded as shown at 19 to receive the pump 2. The testing fluid is admitted through the pipe 20 and thence through the duct 21, and into the pipe 17. The sleeve 22 in this instance surrounds the body 18 and the threads 23 thereon are external. The inside of the sleeve 22 is cut away as shown at 24, to provide a thin distortable wall back of the threads 23. This cut-out is also annular, the same as previously described. A duct 25 extends from this pump 2 to the annular cut-out 24 whereby hydraulic pressure can be exerted against the threads 23 to effectively seal the same. The sleeve 22 is held in position on the body 18 by means of set screws 26, and also the nut 27 which screws on to the bottom of the body 18 and bears against the bottom of the sleeve 22. In both instances, pressure exerted by the pump 2 will press the threads of the testing plug tightly against the threads of the pipe.

Having described my invention, I claim:

1. In combination with a threaded pipe, a testing plug, including a threaded section adapted to screw on to a pipe, said plug having a chamber back of the threads and means to exert pressure in said chamber to press said threads against the pipe.

2. In combination with a threaded pipe, a testing plug, including a threaded section adapted to screw on to a pipe, said plug having a chamber back of the threads, and means to exert hydraulic pressure in said chamber to press said threads against the pipe.

3. In combination with a threaded pipe, a testing plug comprising a housing, a sleeve mounted on said housing, threads on said sleeve adapted to screw on to a pipe, said sleeve having a chamber back of said threads and means to exert pressure in said chamber to press said threads against the pipe.

4. In combination with a threaded pipe, a testing plug comprising a housing, a sleeve removably mounted on said housing, threads on said sleeve adapted to screw on to a pipe, said sleeve having a chamber back of said threads, and means to exert pressure in said chamber to press said threads against the pipe.

5. In combination with a threaded pipe, a testing plug comprising a housing, a sleeve mounted on said housing, threads on said sleeve adapted to screw on to a pipe, said sleeve having a chamber back of said threads and means to exert hydraulic pressure in said chamber to press said threads against the pipe.

6. In combination with a threaded pipe, a testing plug comprising a housing, a sleeve mounted on said housing, threads on said sleeve adapted to screw on to a pipe, said sleeve having a chamber back of said threads, a pump mounted on the housing and connected to the said chamber, whereby pressure is exerted in said chamber to press said threads against the pipe.

7. In combination with a threaded pipe, a testing plug comprising a housing, a sleeve mounted on said housing, threads on said sleeve adapted to screw on to a pipe, said sleeve having a chamber back of said threads, a hydraulic pump mounted on the housing and connected to the said chamber, whereby pressure is exerted in said chamber to press said threads against the pipe.

8. In combination with a threaded pipe, a testing plug comprising a housing, a sleeve removably mounted on said housing, threads on said sleeve adapted to screw on to a pipe, said sleeve having a chamber back of said threads, a hydraulic pump mounted on the housing and connected to the said chamber, whereby pressure is exerted in said chamber to press said threads against the pipe.

9. In combination with a threaded pipe, a testing plug comprising a housing, a sleeve removably mounted in said housing, threads on said sleeve adapted to screw onto the pipe, said sleeve having an annular cutout therein forming a chamber back of said threads, said housing having a duct formed therein extending to said chamber whereby pressure is exerted in said chamber to press said threads against the pipe.

10. In combination with a threaded pipe, a testing plug comprising a housing, a sleeve removably mounted in said housing, threads on said sleeve adapted to screw onto the pipe, said sleeve having an annular cutout therein forming a chamber back of said threads, said housing having a duct formed therein extending to said chamber whereby pressure is exerted in said chamber to press said threads against the pipe, and annular packing mounted in said sleeve above and below said chamber, said packing bearing against the housing.

BENJAMIN W. SUNDE.

REFERENCES CITED

The following references are of record in the file of this patent:

UNITED STATES PATENTS

| Number | Name | Date |
|---|---|---|
| 1,221,733 | Henderson | Apr. 3, 1917 |
| 1,788,845 | Reynolds | Jan. 13, 1931 |
| 1,904,250 | Purvis | Apr. 18, 1933 |
| 2,133,934 | Ericsson | Oct. 18, 1938 |
| 2,299,116 | Svirsky | Oct. 20, 1942 |